US012776559B2

(12) United States Patent
Carpintero Del Barrio et al.

(10) Patent No.: US 12,776,559 B2
(45) Date of Patent: Oct. 27, 2026

(54) ULTRA-WIDEBAND RF BIDIRECTIONAL COUPLER HAVING GROUPS OF DIELECTRIC WAVEGUIDE STRUCTURES FUNCTIONING AS A POWER DIVIDER/COMBINER

(71) Applicant: UNIVERSIDAD CARLOS III DE MADRID, Madrid (ES)

(72) Inventors: Guillermo Carpintero Del Barrio, Getafe (ES); Alejandro Rivera Lavado, Getafe (ES); Luis Enrique García Muñoz, Getafe (ES); Ali Muhsin, Getafe (ES)

(73) Assignee: UNIVERSIDAD CARLOS III DE MADRID, Madrid (ES)

( * ) Notice: Subject to any disclaimer, the term of this patent is extended or adjusted under 35 U.S.C. 154(b) by 170 days.

(21) Appl. No.: 18/575,168

(22) PCT Filed: Jun. 28, 2022

(86) PCT No.: PCT/EP2022/067714

§ 371 (c)(1),
(2) Date: Dec. 28, 2023

(87) PCT Pub. No.: WO2023/275042

PCT Pub. Date: Jan. 5, 2023

(65) Prior Publication Data

US 2024/0313385 A1 Sep. 19, 2024

(30) Foreign Application Priority Data

Jun. 29, 2021 (EP) .................................... 21382573

(51) Int. Cl.
*H01P 5/18* (2006.01)
*H01P 5/08* (2006.01)
*H01Q 5/25* (2015.01)

(52) U.S. Cl.
CPC .............. *H01P 5/188* (2013.01); *H01P 5/087* (2013.01); *H01Q 5/25* (2015.01)

(58) Field of Classification Search
CPC .. H01P 5/188; H01P 5/18; H01P 5/181; H01P 5/182

(Continued)

(56) References Cited

U.S. PATENT DOCUMENTS 2,794,959 A * 6/1957 Fox ......................... H01P 5/188 333/81 B
3,558,213 A 1/1971 Enrique
4,028,643 A * 6/1977 Itoh ........................... H01P 3/16 333/236

FOREIGN PATENT DOCUMENTS

JP 2000022412 A 1/2000
WO WO2023275042 A1 1/2023

* cited by examiner

*Primary Examiner* — Benny T Lee

(57) ABSTRACT

An ultra-wideband radio-frequency bidirectional coupler with power divider/combiner functionality (200A, 200B, 300, 400A, 400B, 400C) for signals with frequency reaching up to 300 GHz, a free propagation region substrate (210) with a pair of opposed edges (240A, 240B), a first group of access ports (P-L1-P-LM) established along the at least one edge of said free propagation region substrate (210); and a second group of access ports (P-R1-P-RM) established along the opposite edge of said free propagation region substrate (210), wherein the first and second groups of access ports (P-L1-P-LM), (P-R1-P-RN) comprise dielectric waveguide structures (DW-L1-DW-LM), (DW-R1-DW-RN) providing a high-pass characteristic interconnect operating over a high frequency range starting from a low cut-off frequency for in the microwave range or in the millimeter-wave range.

18 Claims, 17 Drawing Sheets

(58) Field of Classification Search
USPC .......................................................... 333/113
See application file for complete search history.

300

300

300

300

300

ULTRA-WIDEBAND RF BIDIRECTIONAL COUPLER HAVING GROUPS OF DIELECTRIC WAVEGUIDE STRUCTURES FUNCTIONING AS A POWER DIVIDER/COMBINER

CROSS-REFERENCE TO RELATED APPLICATION

This application is a national stage application, filed under 35 U.S.C. § 371, of International Patent Application No. PCT/EP2022/067714, filed on Jun. 28, 2022, which claims the priority to European application No. EP21382573 filed Jun. 29, 2021, the contents of which are incorporated by reference.

The present invention relates generally to radiofrequency bidirectional couplers with power divider/combiner functionality, a kind of devices used in the field of radio frequency engineering that split the energy of a radiofrequency signal propagating through one of the M input among a group of N outputs (divider), which also enables to combine the energy propagating through various inputs into a common output (combiner). This invention discloses a directional coupler structure based on dielectric waveguides that is wideband and broadband. Wideband since it operates over a wide frequency range, and broadband, since is suited for modulated signals occupying a wide bandwidth.

BACKGROUND OF THE INVENTION

Radiofrequency (RF) systems operate handling signals in the form of guided electromagnetic waves with frequencies starting around 30 MHz and going up into the millimeter (30 GHz to 300 GHZ) and Terahertz (300 GHz to 3000 GHZ) regions of the spectrum. In the handling of these signals, RF systems might need to split a radiofrequency signal propagating through a waveguide into several copies of the radiofrequency signal, with varying amount (split ratio) of energy within each copy, each delivered at different output waveguides. This function constitutes a power divider. The reciprocal function, combining different RF signals into a common output which constitutes a power combiner, is also of interest.

A particular case of such functionality are passive devices known as bidirectional couplers, which are schematically represented in FIG. 1. This figure shows a bidirectional coupler (100) with four access ports. The incoming signal arrives to the directional coupler at its input port (P1), coupling a defined amount of energy from this input port (P1) to an output transmission port (P2) through a main line and another amount to a second output, known as coupled port (P4). The incoming signal power at the input port (P1) is commonly split between the output ports using transmission lines close to each other, allowing the energy passing through one waveguide to couple into the other by evanescent wave leakage. In some devices, any reflection of the signal exiting through the output port (P2) returning to the device enters at this port (P2), being routed to the isolation port (P3). The device is bidirectional as any port can be the input, which will result in the directly connected port being the transmitted port, adjacent port being the isolated port, and the diagonal port being the coupled port.

Directional couplers and power dividers have many applications. These include providing a signal sample for measurement or monitoring, feedback, combining feeds to and from antennas, antenna beam forming, providing taps for cable distributed systems such as cable TV, and separating transmitted and received signals on telephone lines.

Current directional couplers are mostly limited to the microwave frequency range (3 GHz to 30 GHZ) using transmission line designs. Hence, there is a demand to obtain an ultra-wideband directional coupler that covers a wide frequency range, including the range of coaxial standards (such as 1-mm connector, up to 110 GHZ) and which can operate independently of the different rectangular waveguide standards used by radiofrequency engineering technology for frequencies above (such as, WR8 –90 GHz to 140 GHZ–, WR6 –110 GHz to 170 GHz– and WR5 –140 GHz to 220 GHz–). The present invention satisfies this demand, enabling an extremely wide operation frequency range.

SUMMARY OF THE INVENTION

The present invention proposes a new bidirectional coupler with power divider/combiner functionality based on dielectric waveguide structures to extend the operation frequency range of the device covering the micro (3 GHZ to 30 GHZ), the millimeter (30 GHz to 300 GHZ) and terahertz (300 GHz to 3000 GHz) wave ranges.

The coupler comprises a free propagation region substrate with a pair of opposed edges. Furthermore, the coupler comprises a first group of access ports along a first edge of the opposed edges of the free propagation region substrate and a second group of access ports along a second edge of the opposed edges of the free propagation region substrate. The first and second groups of access ports comprise dielectric waveguide structures providing a high-pass filter transfer function operating over a high frequency range starting from a low cut-off frequency $f_{CL}$ in the microwave or millimeter-wave ranges.

In a first example, the first edge of the opposed edges may be shaped as an arc of a circle with radius r1 and a center OA is located closer to the second edge.

In another example, the second edge of the opposed edges may be also shaped as an arc of a second circle with radius r2 and a center OB is located closer to the first edge.

In another example, the arc of the circles can have the same radius (r1=r2), and the centers, OA and OB, are located along one of the port axes.

In some examples, the ultra-wideband radiofrequency bidirectional further comprises a plurality of arms, wherein the plurality of arms allocates the first group of access ports and the second group of access ports.

In some examples, the dielectric waveguide structures are established on top of the free propagation region substrate.

In some examples, the dielectric waveguide structures are embedded in the free propagation region substrate.

In a preferred example, the dielectric waveguide “DW” structures comprise tapered ends that comprise a dielectric waveguide (DW) tapering profile. The first and second group of access ports further comprise tapered slot antennas “TSA” providing a band-pass filter transfer function, operating over a low frequency range up to a high cut-off frequency $f_{CH}$ in the millimeter/sub-millimeter wave range.

The tapered slot antennas comprise a tapered slot antenna (TSA) tapering profile around a first tapered end of the dielectric waveguide structures wherein the TSA tapering profile matches the DW tapering profile.

In some examples, the TSA tapering profile and the DW tapering profile are linear tapered.

In some examples, the TSA tapering profile and the DW tapering profile are exponential tapered.

In some examples, the TSA tapering profile and the DW tapering profile are FERMI or exponentially tapered.

In another preferred example, the ultra-wideband bidirectional coupler with power divider/combiner functionality comprises a second substrate on which a low-frequency directional coupler is established, configured to operate from DC (or very low frequency, down to few kHz) up to a low cut-off frequency fc in the millimeter wave range. In this structure, a plurality of transmission line and waveguide transitions that connects the low-frequency directional coupler and the tapered slot antennas for achieving a directional coupler with an operating frequency range from low frequency up to $f_{CH}$.

In another preferred example, the ultra-wideband bidirectional coupler with power divider/combiner functionality comprises two first access ports along the at least one edge of the free propagation region substrate comprising two dielectric waveguide structures having tapered ends and two second access ports along the opposite edge of the free propagation region substrate comprising two dielectric waveguide structures having tapered ends. In this example, the four dielectric waveguide structures comprise a DW tapering profile, and the ultra-wideband bidirectional coupler further comprises four tapered slot antennas providing a low-pass characteristic, operating over a low frequency range up to a high cut-off frequency $f_{CH}$ in the millimeter wave range, wherein the tapered slot antennas comprise a TSA a tapering profile around a first tapered end of the dielectric waveguide structures wherein the TSA tapering profile matches the DW tapering profile.

In other examples, the dielectric waveguide structures can comprise at least one truncated end.

In other examples, the free propagation region substrate can have a different permittivity than dielectric waveguide structures.

In other examples, the free propagation region substrate can comprise absorbers.

In other examples, the free propagation region substrate can comprise dielectric material.

BRIEF DESCRIPTION OF THE DRAWINGS

For a better understanding the above explanation and for the sole purpose of providing an example, some non-limiting drawings are included that schematically depict a practical embodiment. It is noted that like features are denoted by the same reference labels throughout the detail description of the drawings.

DETAILED DESCRIPTION OF EMBODIMENTS

Figure 2A:
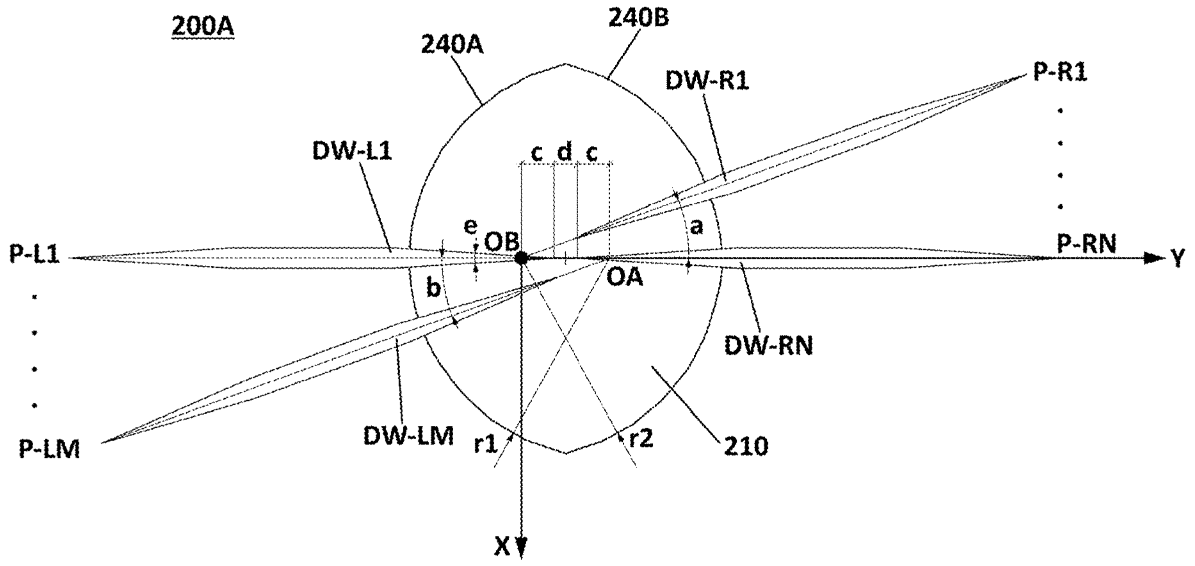
FIG. 2A shows an ultra-wideband bidirectional coupler according to the present invention.

FIG. 2A shows a proposed dielectric structure as bidirectional coupler with power divider/combiner functionality (200A) according to the present invention. The proposed structure (200A) comprises a first group of M input access ports in the left in the figure from (P-L1) to (P-LM), which are coupled to the second group of N output access ports on the right in the figure from (P-R1) to (P-RN) via a free propagation region substrate (210). The left edge (240A) of the free propagation region, along which the access ports (P-L1) to (P-LM) are laid along, is shaped by the arc of a circle with a radius r1 and a center OA which is closer to the opposite edge (240B) of the free propagation region substrate (210). The edge (240B) of the free space propagation region, along which the output access ports (P-R1) to (P-RN) are laid along, is shaped by the arc of a circle with a radius r2 and a center OB which is closer to the opposite edge (240A) of the free space propagation region.

In a preferred implementation, the arc of the circle for input and output waveguides can have the same radius (r1=r2=r), and the centers, OA and OB, are located along one of the port axes.

Figure 2B:
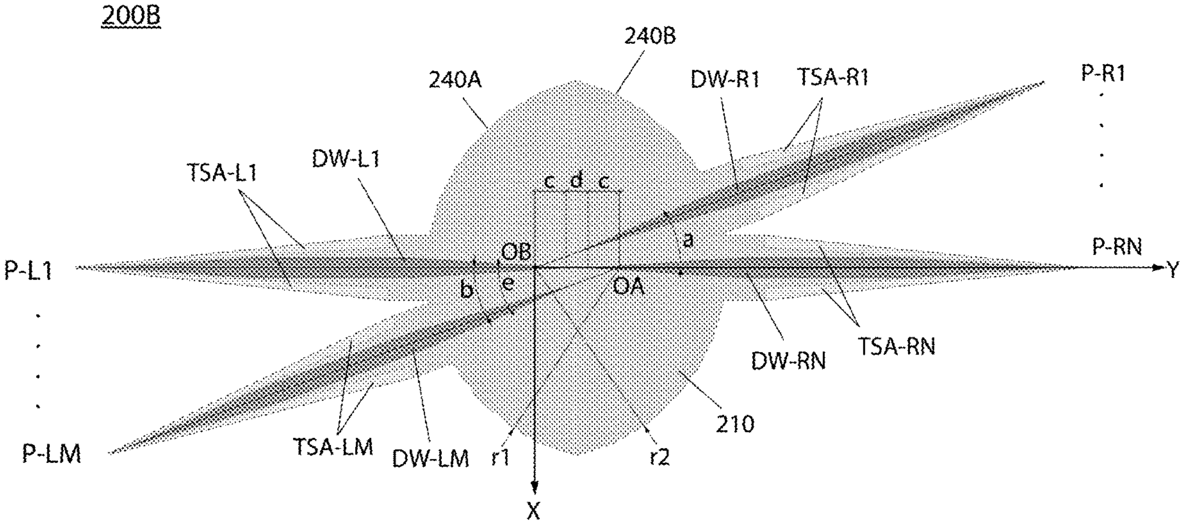
FIG. 2B shows the ultra-wideband bidirectional coupler of FIG. 2A further comprising tapered slot antennas to launch radio-frequency signals into the dielectric waveguides according to the present invention.

The access ports (PL1-PLM), (PR1-PRM) comprise dielectric waveguide structures, in the left in the figure from (DW-L1) to (DW-LM), and in the right in the figure from (DW-R1) to (DW-RN), all comprising tapered ends for this particular example. Advantageously, the dielectric waveguide structures couple the electromagnetic energy propagating through them into the free propagation region substrate (210), reducing the insertion losses between ports which are now proportional to the distance between the input and output ports, instead of being proportional to the square spacing of the DW structures, the square spacing being defined by a distance d between the DW structures and not being constrained by the far-field criterion, wherein:

$$d >> 2D^2/\lambda$$

where D is the largest waveguide structure dimension and λ is the signal wavelength. However, DW structures emit in a specific region that shifts along its axis for varying signal frequency. Since the phase center is close to the DW tip at high frequencies, any distance between two radiation zones fits the far-field criterion. In FIGS. 2A and 2B, "a" is a relative angle between DW-R1 axis and the input port DW-L1 axis, "b" is a relative angle between the port DW-LM axis and the input port DW-L1 axis, "c" is a distance between the center OA and the DW-RN tip/vertex or a distance between the center OB and the DW-L1 tip/vertex, "d" is a distance between the DW-RN tip/vertex and the DW-L1 tip/vertex, and "e" is a taper angle of the DW taper. "X" and "Y" are axes that define a plane corresponding to a surface (e.g., an upper surface) of the free propagation region substrate (210) and having an origin at the center OB. The separation between the access ports (PL1-PLM), (PR1-PRM) is advantageously reduced by the confinement of the electromagnetic energy within the dielectric waveguide, enabling a compact configuration without introducing crosstalk between adjacent access ports.

FIG. 2B shows a preferred implementation for another structure (200B). The structure (200B) comprises a plurality of arms that allocate the first group of access ports (PL1-PLM) and the second group of access ports (PR1-PRM). The structure (200B) includes launching structures for the radio-frequency signal in the dielectric waveguide DW, which advantageously excite only the fundamental mode of the dielectric waveguide DW for every frequency of the operating frequency range. The launching structure comprises a tapered end of the dielectric waveguide structure and a tapered slot antenna, both having the same tapering profile. In the figure, the launching structure is shown for all access ports, with tapered slot antennas on the left (TSA-L1 to TSA-LM) and on the right (TSA-R1 to TSA-RN) around the tapered end of the dielectric waveguide structures (DWL1-DWLM), (DWR1-DWRN) having a matching linear tapering profile between the tapered slot antennas and the dielectric waveguide structures.

The dielectric waveguide structures (DWL1-DWLM), (DWR1-DWRN) have a high-pass filter characteristic, enabling the electrical interconnection of radio-frequency signals with frequencies above a low cut-off frequency ($f_{CL}$). The dielectric waveguide structures (DWL1-DWLM), (DWR1-DWRN) can be designed to have a low cut-off frequency (fc) in the microwave range (i.e. between 3 GHz to 30 GHZ) or in the millimeter-wave range (i.e. between 30 GHz to 300 GHz), e.g. at an operating frequency of 60 GHz covering a broad frequency range that extends into the Terahertz wave range (i.e. between 300 to 3000 GHZ) and beyond. Preferably, the ultra-wideband bidirectional coupler has a low cut-off frequency ($f_{CL}$) of 65 GHz that can be tuned by modifying the structure dimensions.

The tapered slot antennas (TSA-L1-TSA-LM), (TSA-R1-TSA-RN) have a low-pass filter characteristic, enabling the electrical interconnection of signals from low frequencies up to a high cut-off frequency ($f_{CH}$) in the millimeter-wave range. The tapered slot antenna can be designed as a transmission line with contact tips at its extreme with which establish electrical contact with the access port of the device and can be designed to operate over a range that starts at 0 Hz and extends up into the millimeter-wave range (i.e., between 30 GHz to 300 GHz, e.g., at an operating frequency of 100 GHZ).

As shown in the FIG. 2B, the tapered slot antennas (TSA-L1-TSA-LM), (TSA-R1-TSA-RN) comprise a tapering profile around a first tapered end of the dielectric waveguide structures (DWL1-DWLM), (DWR1-DWRN). Preferably, the TSA tapering profile and the DW tapering is linear tapered. In other examples, different tapering profiles can be implemented, as e.g. FERMI or exponential tapering.

In a preferred embodiment for wideband operation, the tapered slot antennas operate over a frequency range that starts at low frequency and extends above the low cut-off frequency of the dielectric waveguide structure ($f_{CH}$>$f_{CL}$, e.g., above the 60 GHZ of previous example). Preferably, the ultra-wideband bidirectional coupler has a higher cut-off frequency ($f_{CH}$) of, at least, 300 GHz. The cut-off frequency can be increased e.g. by reducing the thickness of the components of the ultra-wideband bidirectional coupler and/or by using materials with different electrical permittivity.

Figure 3:
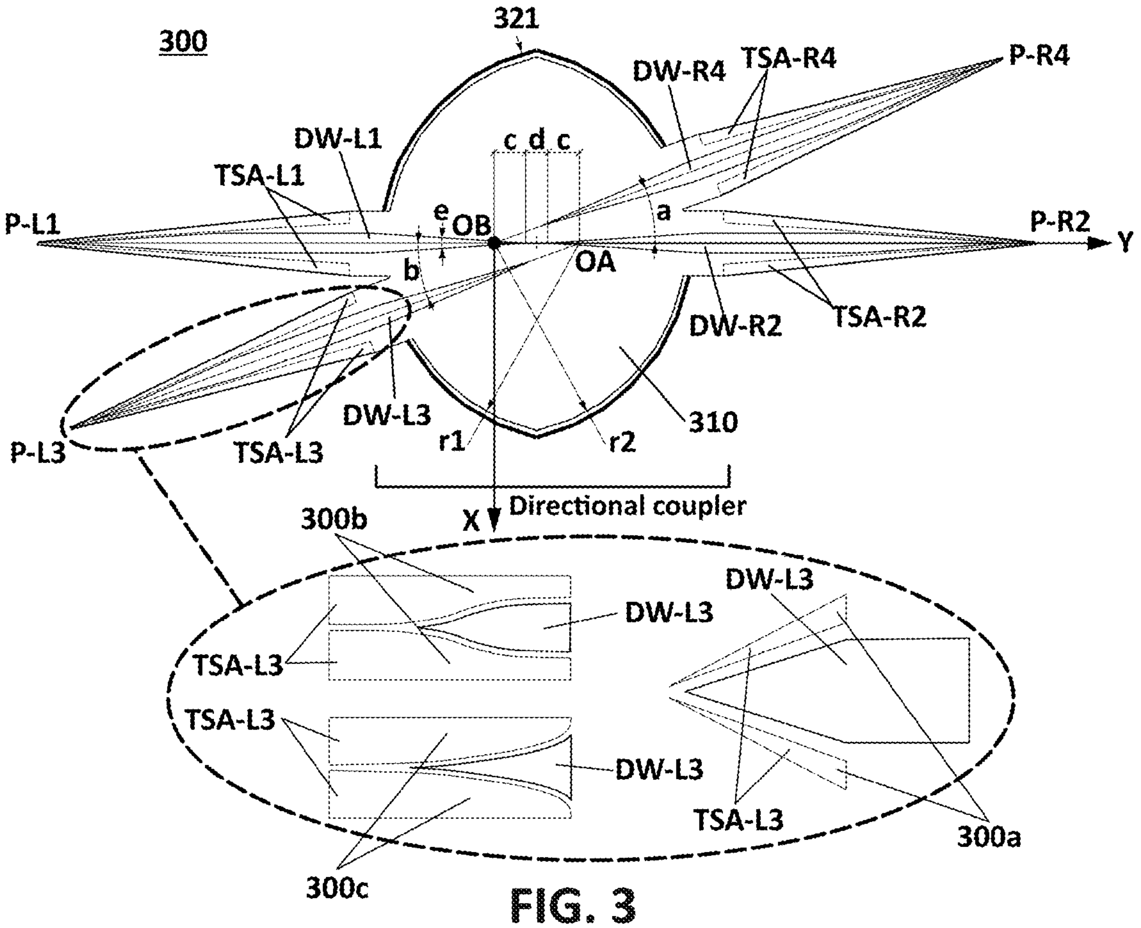
FIG. 3 shows a particular example of an ultra-wideband bidirectional coupler according to the present invention having four access ports.

FIG. 3 shows another bidirectional coupler new bidirectional coupler (Directional coupler) with power divider/combiner functionality (300) according to the invention. In FIG. 3, "a" is a relative angle between DW-R4 axis and the input port DW-L1 axis, "b" is a relative angle between the port DW-L3 axis and the input port DW-L1 axis, "c" is a distance between the center OA and the DW-R2 tip/vertex or a distance between the center OB and the DW-L1 tip/vertex, "d" is a distance between the DW-R2 tip/vertex and the DW-L1 tip/vertex, and "e" is a taper angle of the DW taper. "X" and "Y" are axes that define a plane corresponding to a surface (e.g., an upper surface) of the free propagation region substrate (310) and having an origin at the center OB. The ultra-wideband bidirectional coupler (300) has four access ports, i.e. two input ports (P-L1 and P-L3) and two output ports (P-R4 and P-R2). The signal enters to the directional coupler through an input port (P-L1), coupling a defined amount of electromagnetic power to an output transmission port (P-R2) and another amount to a second output, known as coupled port (P-R4). There is a second input port, (P-L3), known as the isolated port.

The access ports of the ultra-wideband bidirectional coupler (300) comprise dielectric waveguide structures with tapered ends, dielectric waveguide structure (DW-L1) in the input port (P-L1), dielectric waveguide structure (DW-R2) in the transmission port (P-R2), dielectric waveguide structure (DW-R4) in the coupled port (P-R4) and dielectric waveguide structure (DW-L3) in the isolated port (P-R1). The dielectric waveguides structures provide a high-pass filter transfer function operating over a high frequency range starting from a low cut-off frequency ($f_{CL}$) in the microwave range or in the millimeter-wave range.

Optionally, the access ports (P-L1), (P-R2), (P-L3) and (P-R4) can include launching structures to inject the signals into their corresponding dielectric waveguides. The launching structures comprise a tapered slot antennas and tapered ends of the dielectric waveguide, the tapers of both structures comprise the same tapering profile. The tapered slot antennas (TSA-L1), (TSA-R2), (TSA-L3) and (TSA-R4) provide a low-pass characteristic, operating over a low frequency range up to a high cut-off frequency ($f_{CH}$) in the millimeter wave range. The tapered slot antennas comprise a matching pattern defining a tapered coupler, preferably a linear tapering profile around the tapered end of the dielectric waveguide at the access port which together with the corresponding tapered end of the dielectric waveguide achieves an ultra-wideband excitation of the directional coupler in a single-mode regime.

A characteristic of this structure is that the structure allows control of the amount of power coupled from an input port to an output port from the relative angle of their respective locations at the opposite edges of the free propagation region. In FIG. 3 for the ultra-wideband bidirectional coupler (300), the input port (P-L1) electromagnetic energy is divided between the output ports, (P-R2) and (P-R4).

The maximum power coupling occurs when the dielectric waveguides of an input port and an output port are located along the same axis, as shown in FIG. 3 for the Input Port (P-L1) and the Transmission Port (P-R2) of the ultra-wideband bidirectional coupler (300). In this situation, the transmitted signal level between ports (P-L1) and (P-R2) is controlled by the (DW-L1) antenna tapering angle e and the distance between the tips of the (DW-L1, DW-R2) antenna tips, d. Both, smaller e and d lead to larger transmitted signal level.

In the example of FIG. 3, to achieve an ultra-wideband operating frequency range, the structures (DW-R2) and (DW-R4) may point to the phase center of the structure (DW-L1). By reciprocity, the DW structures (DW-L1) and (DW-L3) may point to the phase center of the DW structure (DW-R2). Since the phase center of this structure varies with frequency along the antenna axis, a trade-off can be established to select the frequency for which the phase front is pointed, which sets the upper frequency limit to the bandwidth of the structure.

As shown in FIG. 3, for this example, the DW structure (DW-L1) points toward the DW structure (DW-R2). The DW structure (DW-R4) points toward the structure (DW-L1) phase center at 260 GHz. The length c determines the distance between the phase center and the tip of the DW structure (DW-L1). In this particular example, the DW structure (DW-L3) points towards the DW structure (DW-R2) phase center at 260 GHz.

The coupling level between an input port and an output port when these ports are not in the same axis is controlled by the relative angle between their positions, as shown in FIG. 3 for the input port (P-L1) and the transmission port (P-R4) of the ultra-wideband bidirectional coupler (300). For this example, the angle a controls the coupling ratio between the input port (P-L1) and the transmission port (P-R4). By reciprocity, the angle b controls the coupling ratio between the output port (P-R2) and the isolation port (P-L3). In the figure, both angles are equal, but a and b can be designed independently to achieve different coupling ratios between ports (P-L3) and (P-R2) with respect to (P-L1) and (P-R4). The coupling ratios are reduced when the angle increases.

In this particular embodiment, the tapered slot antenna (TSA-L3) tapering profile (300*a*) and the DW (DW-L3) tapering profile are linear tapered, as shown in the zoom of FIG. 3. However, other tapering profiles can be implemented, as e.g, wherein the tapered slot antenna (TSA-L3) tapering profile (300*b*) and the DW (DW-L3) tapering profile are exponential tapered, or wherein the tapered slot antenna (TSA-L3) tapering profile (300*c*) and the DW (DW-L3) tapering profile are FERMI or exponentially tapered.

Other examples with different trade-offs are possible, that allows to boost the device specifications in a sub-band of interest or to increase the bandwidth. For avoiding reflections in the dielectric material, absorbers (321) can be placed in the end of the free propagation region (310).

Figure 4A:
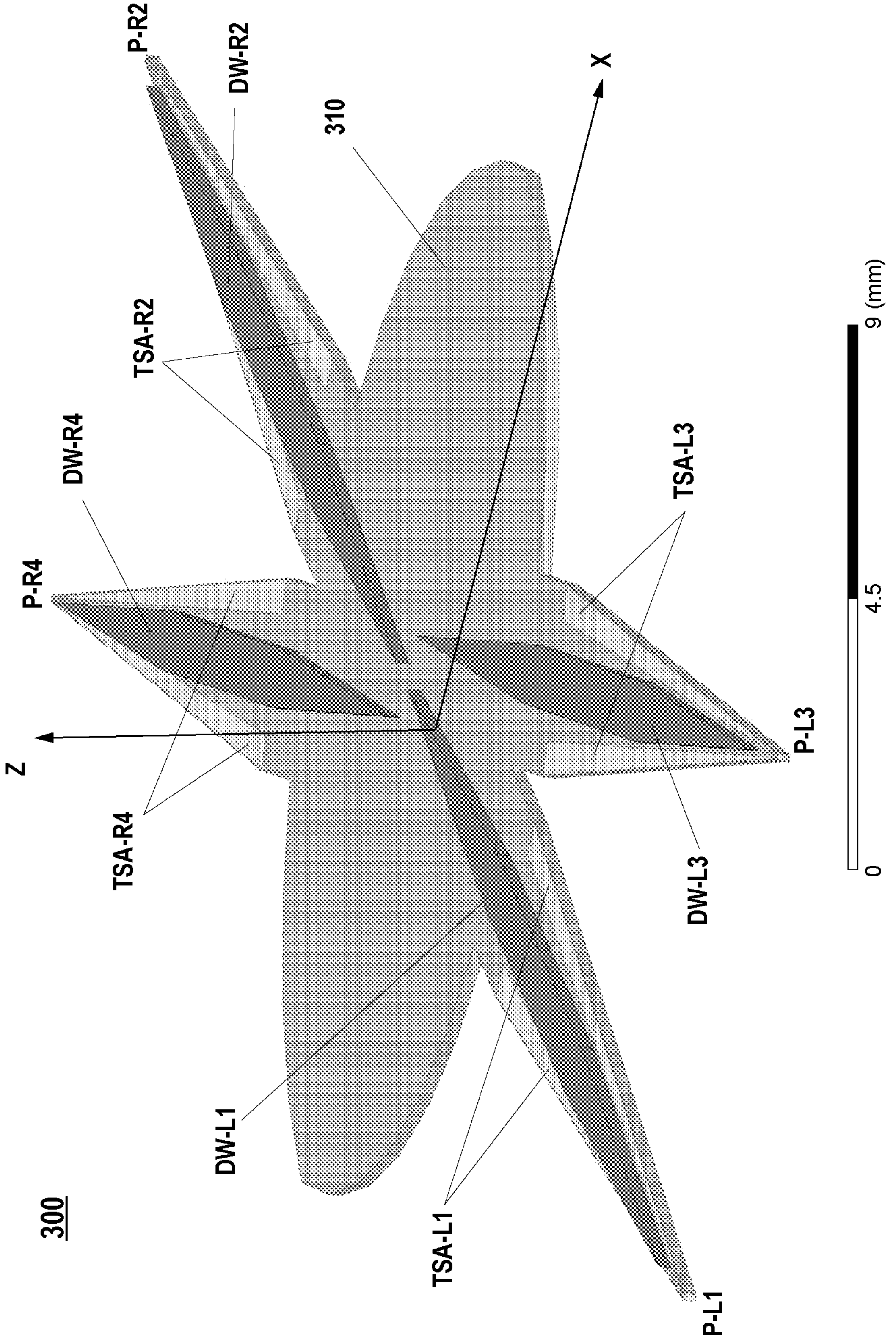
FIG. 4A shows a 3D view of the particular example of an ultra-wideband bidirectional coupler shown in FIG. 3, where the dielectric waveguide access structures are located on top of the free propagation region substrate.

FIG. 4A shows a 3D view of ultra-wideband bidirectional coupler (300) when the dielectric waveguides and the free propagation region, which can be realized with materials of equal or different permittivity, are stacked, i.e. the free propagation region (310), the four DW structures (DW-L1, DW-R2, DW-L3, DW-R4) and the tapered slot antennas (TSA-L1, TSA-R2, TSA-L3, TSA-R4). In FIG. 4A, "X" and "Z" are axes that define a plane perpendicular to a surface (e.g., an upper surface) of the free propagation region substrate (310).

Figure 4B:
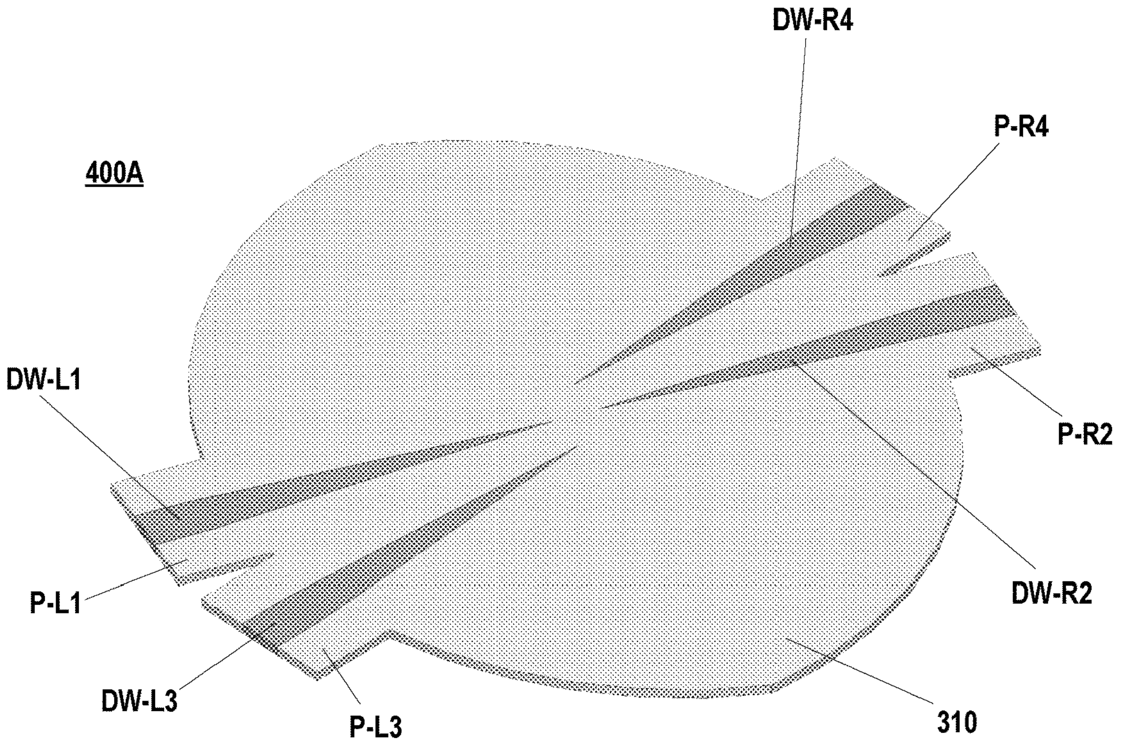
FIGS. 4B to 4D show 3D views of examples of an ultra-wideband bidirectional coupler according to the present invention where the dielectric waveguide access structures are embedded in the free propagation region substrate.

In another example, an alternative single-layer embodiment is obtained when the DW structures (DW-L1, DW-R2, DW-L3, DW-R4) are embedded within the free propagation region (310) to obtain a more compact system. The embedding implies any fabrication method that achieves to create differences in the permittivity within the free propagation region to define a dielectric waveguide structure, i.e. for example, either by etching porosities for reducing the permittivity around the DW structures or by assembling parts of different permittivity. In this respect, FIG. 4B shows a 3D view of ultra-wideband bidirectional coupler (400A), wherein the DW structures (DW-L1, DW-R2, DW-L3, DW-R4) are embedded in the free propagation region (310) and wherein the DW structures (DW-L1, DW-R2, DW-L3, DW-R4) are truncated.

Figure 4C:
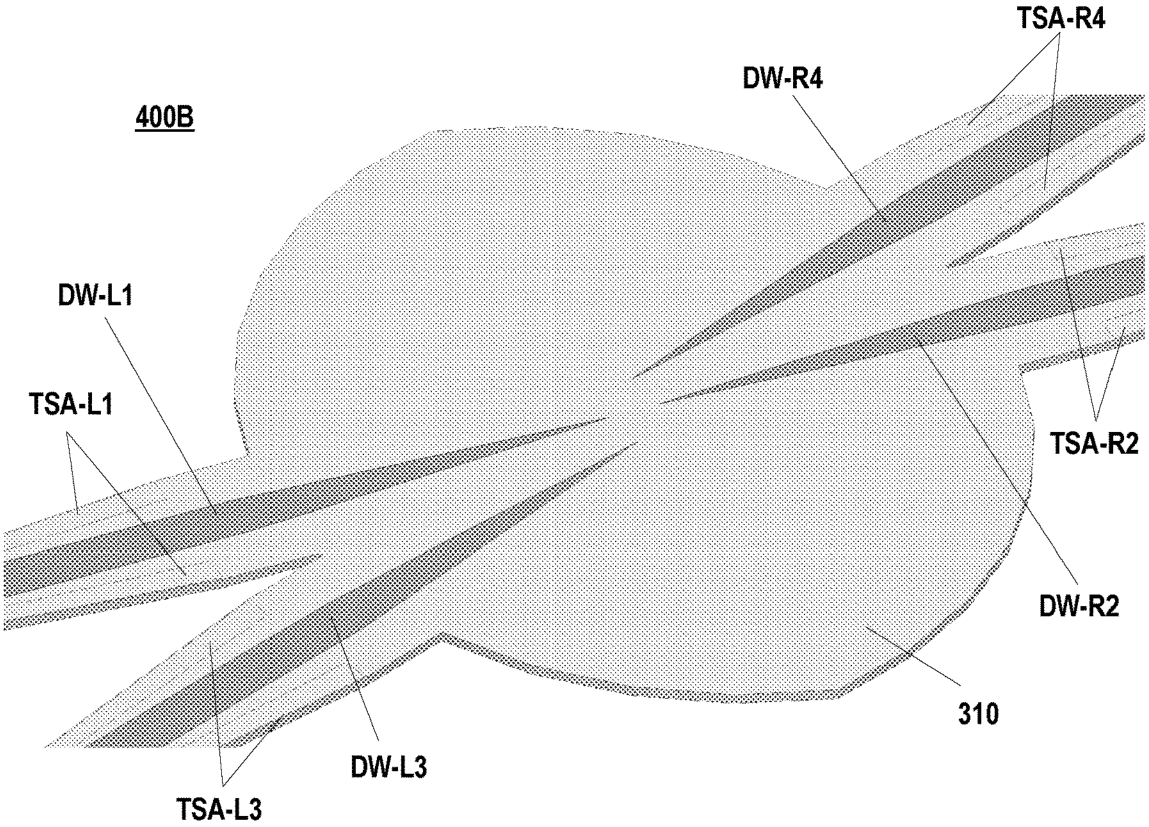

FIG. 4C shows a 3D view of ultra-wideband bidirectional coupler (400B), wherein the DW structures (DW-L1, DW-R2, DW-L3, DW-R4) are embedded in the free propagation region (310) and include the launching structure tapered slot antennas (TSA-L1, TSA-R2, TSA-L3, TSA-R4) at the access ports, wherein the tapered slot antennas are established on the dielectric material of the free propagation region.

Figure 4D:
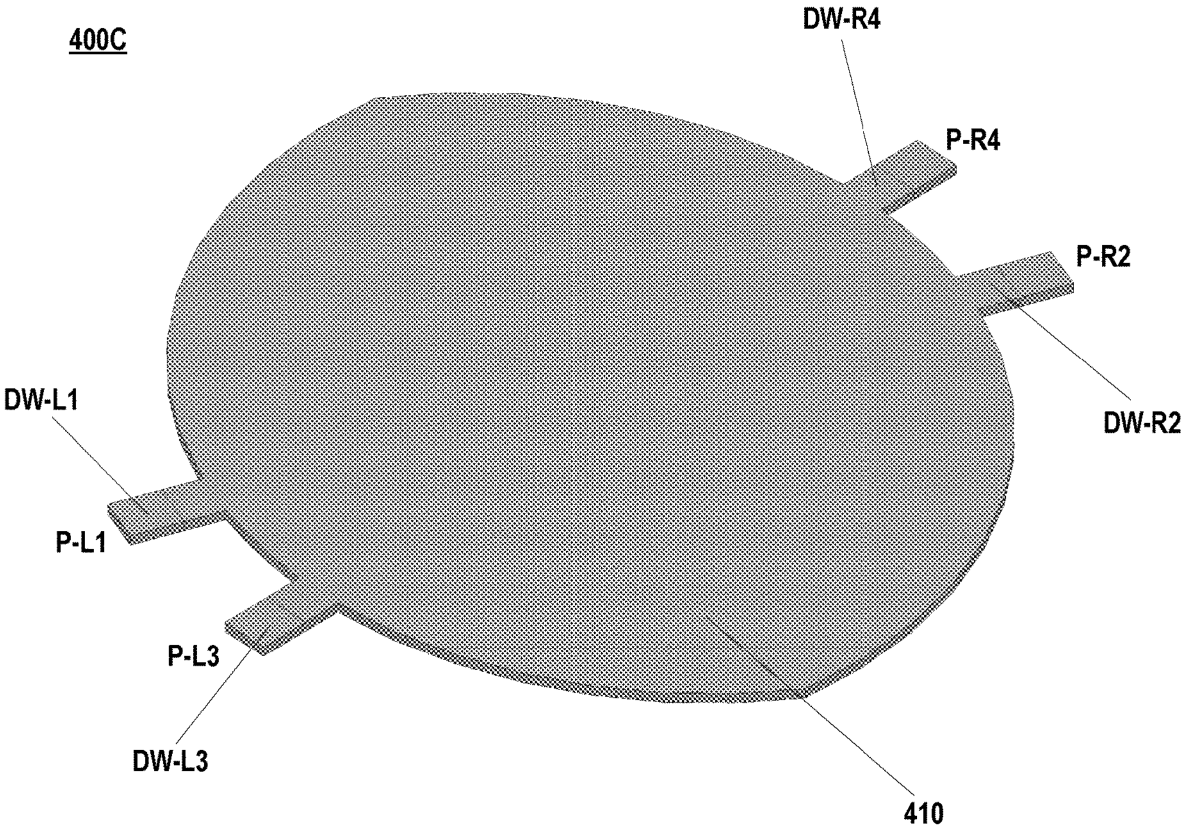
Figure 5A:
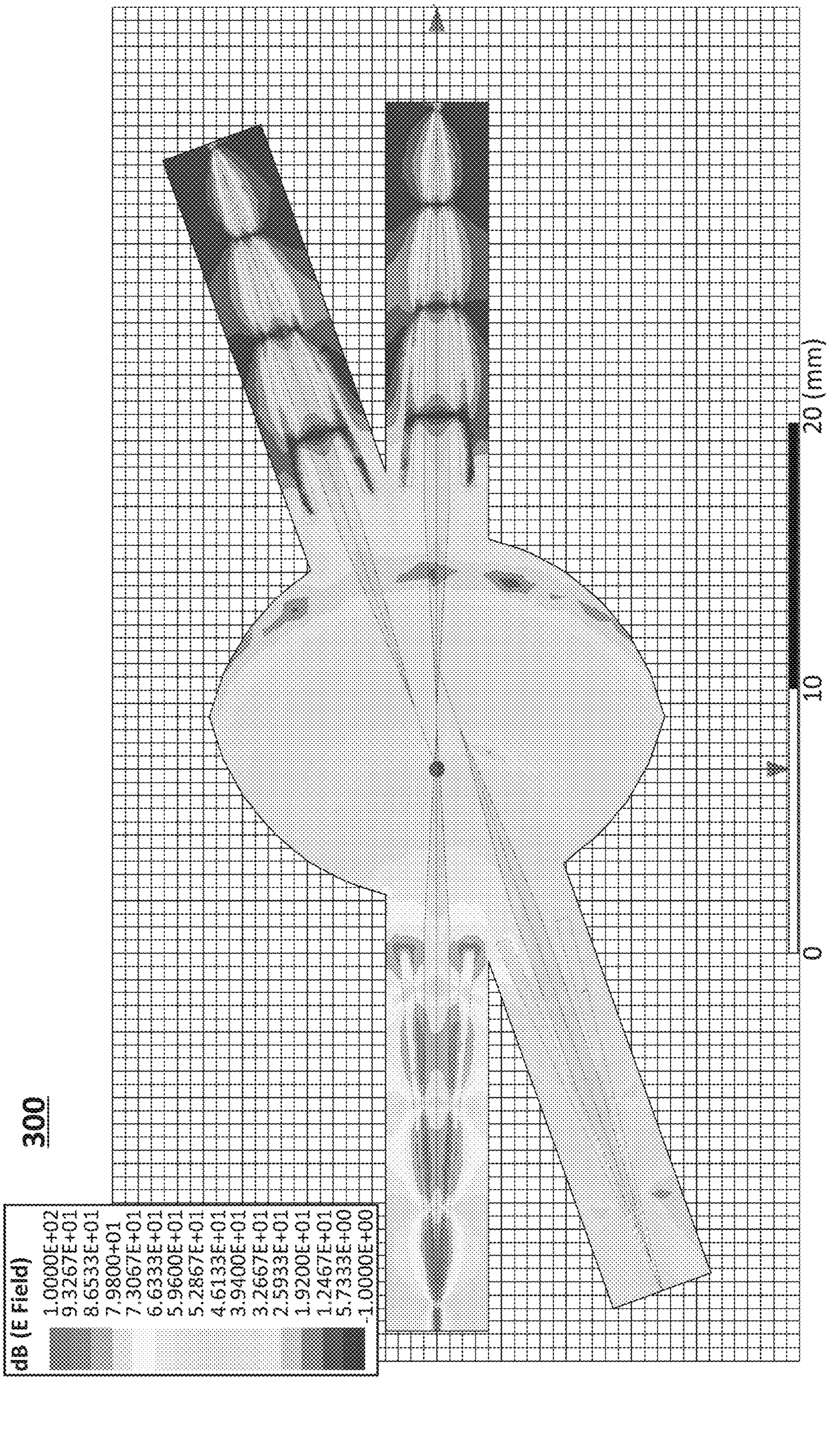
FIGS. 5A to 5H show the E-field amplitude distributions at different frequencies in the range from 20 GHz to 300 GHz of the particular example of the ultra-wideband bidirectional coupler shown in FIG. 3 according to the present invention.
Figure 5B:
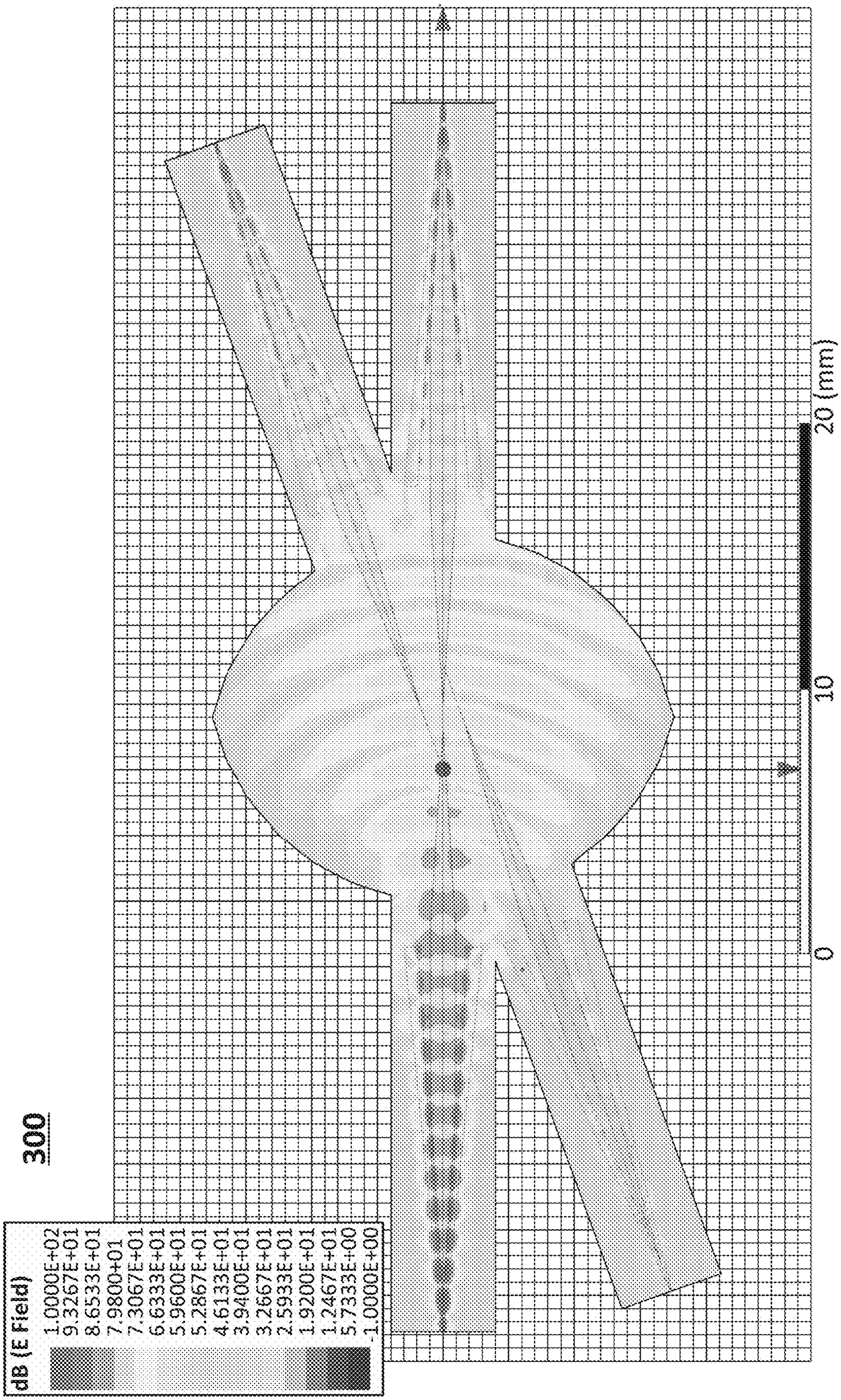
Figure 5C:
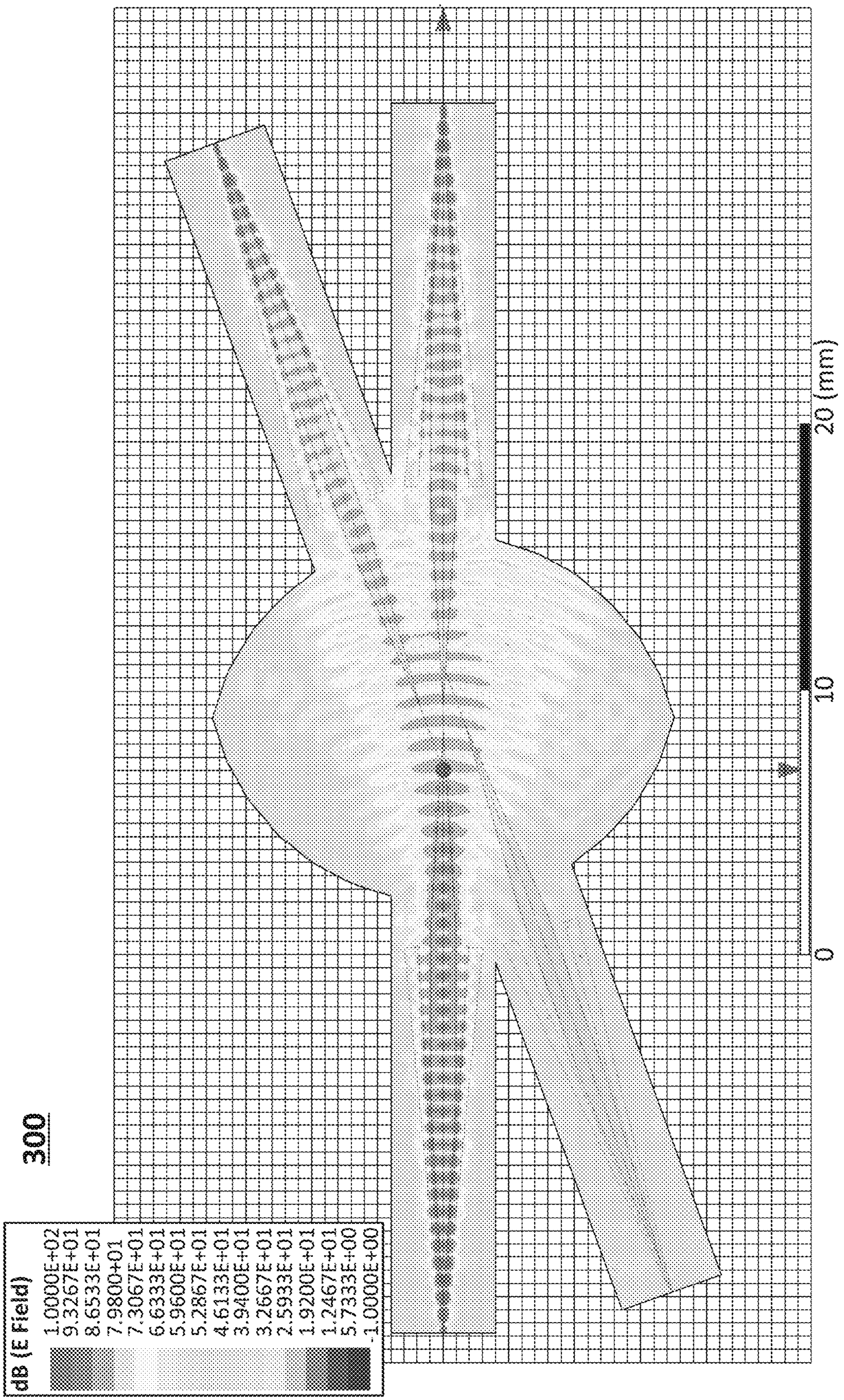
Figure 5D:
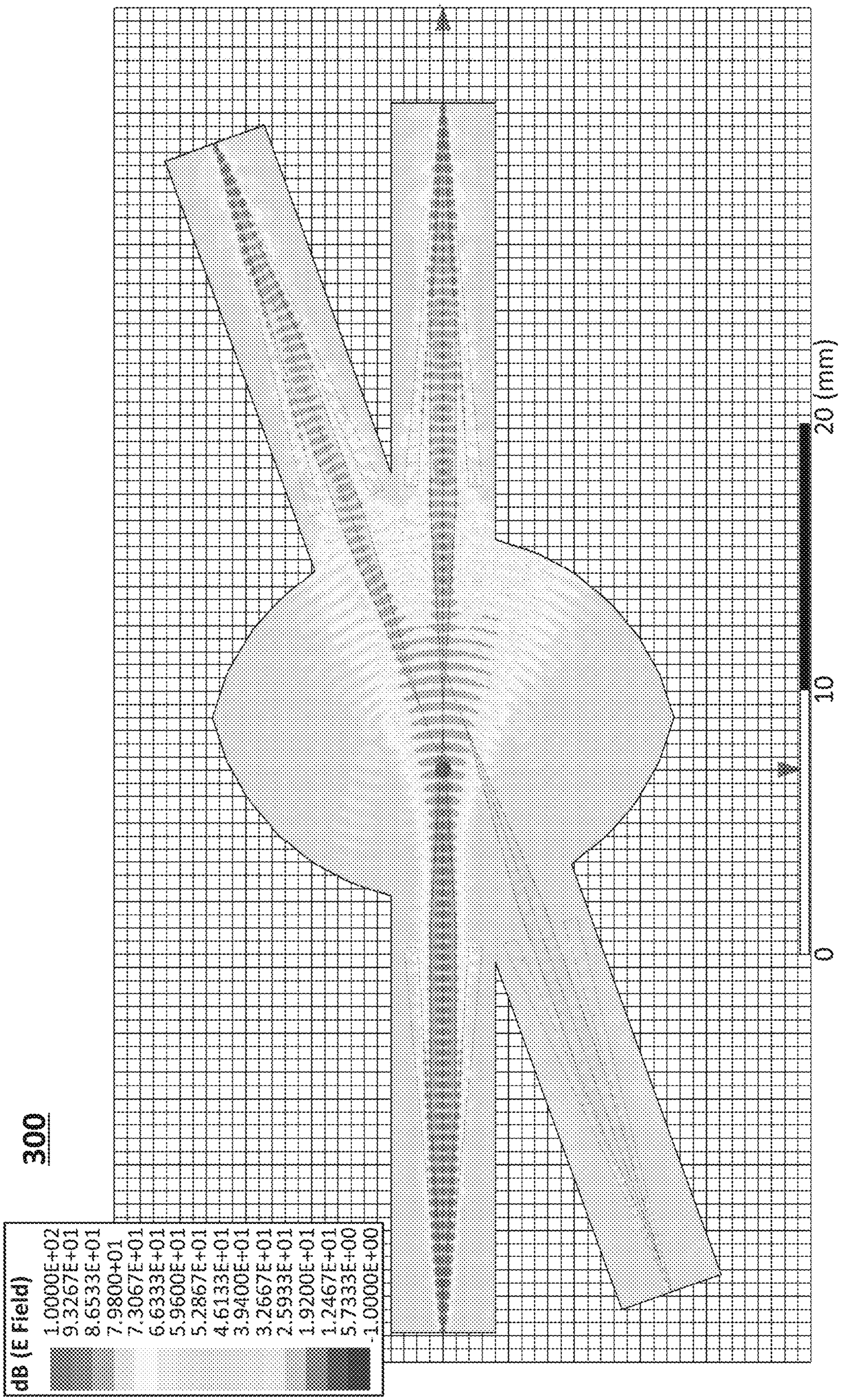
Figure 5E:
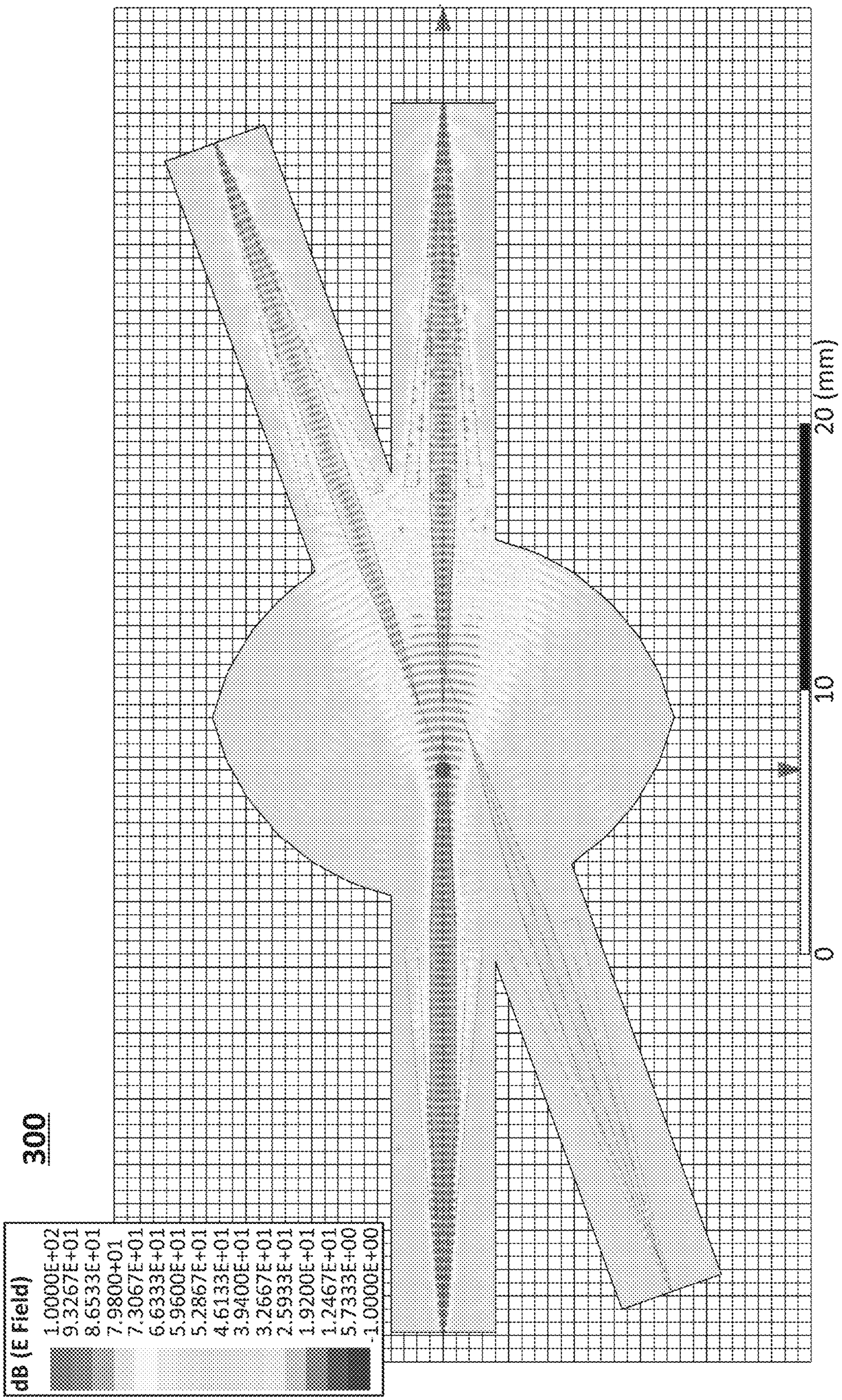
Figure 5F:
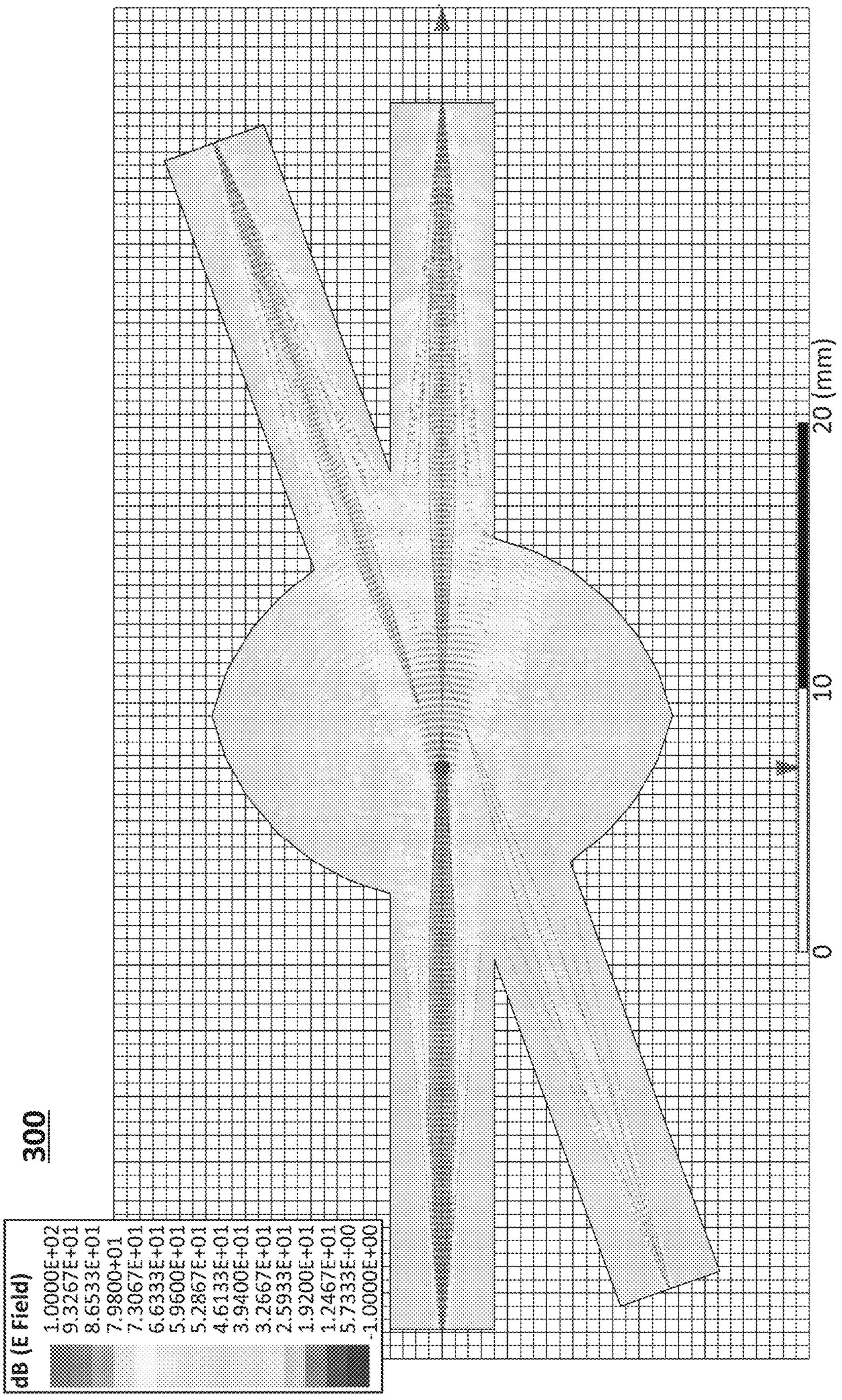
Figure 5G:
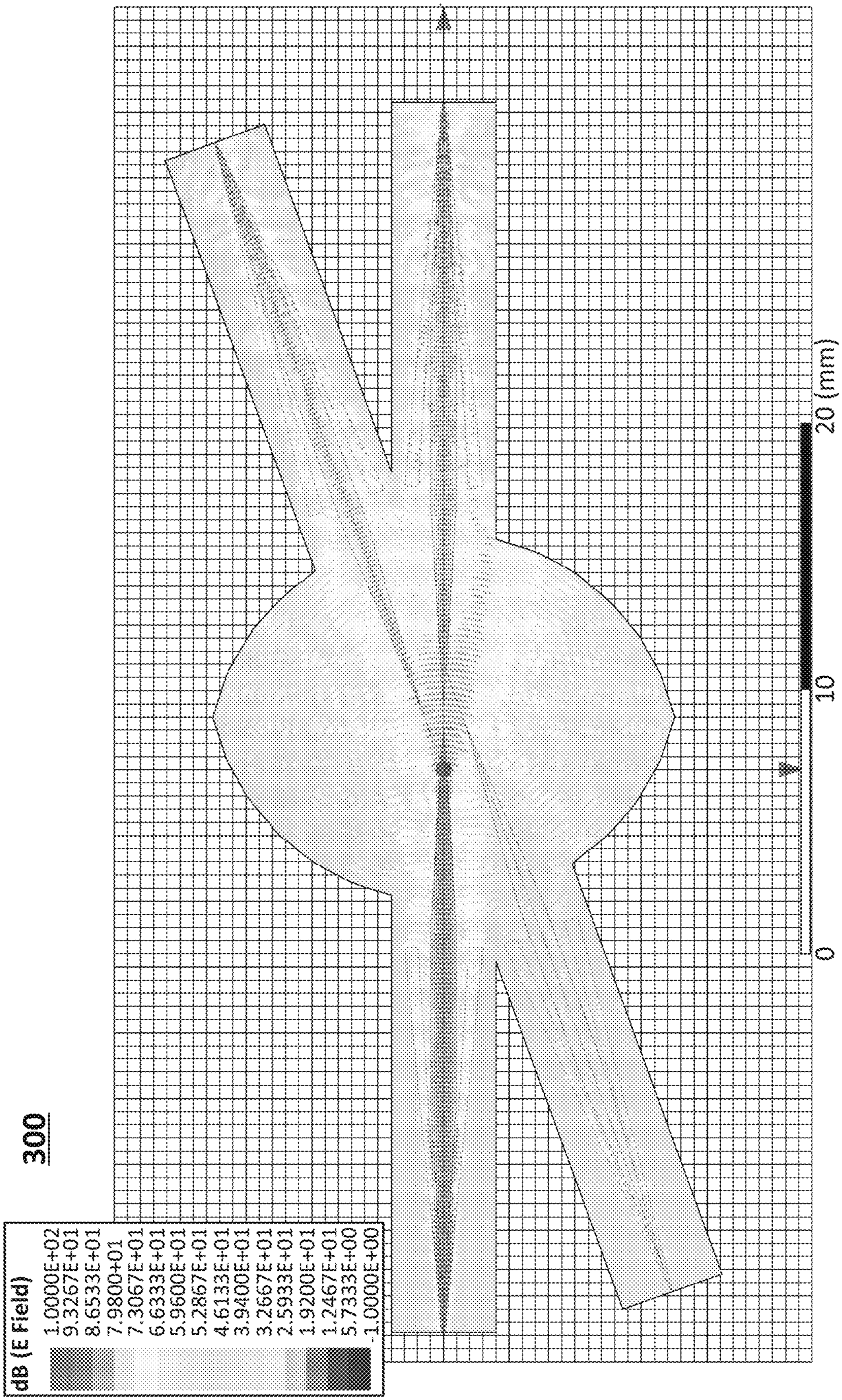
Figure 5H:
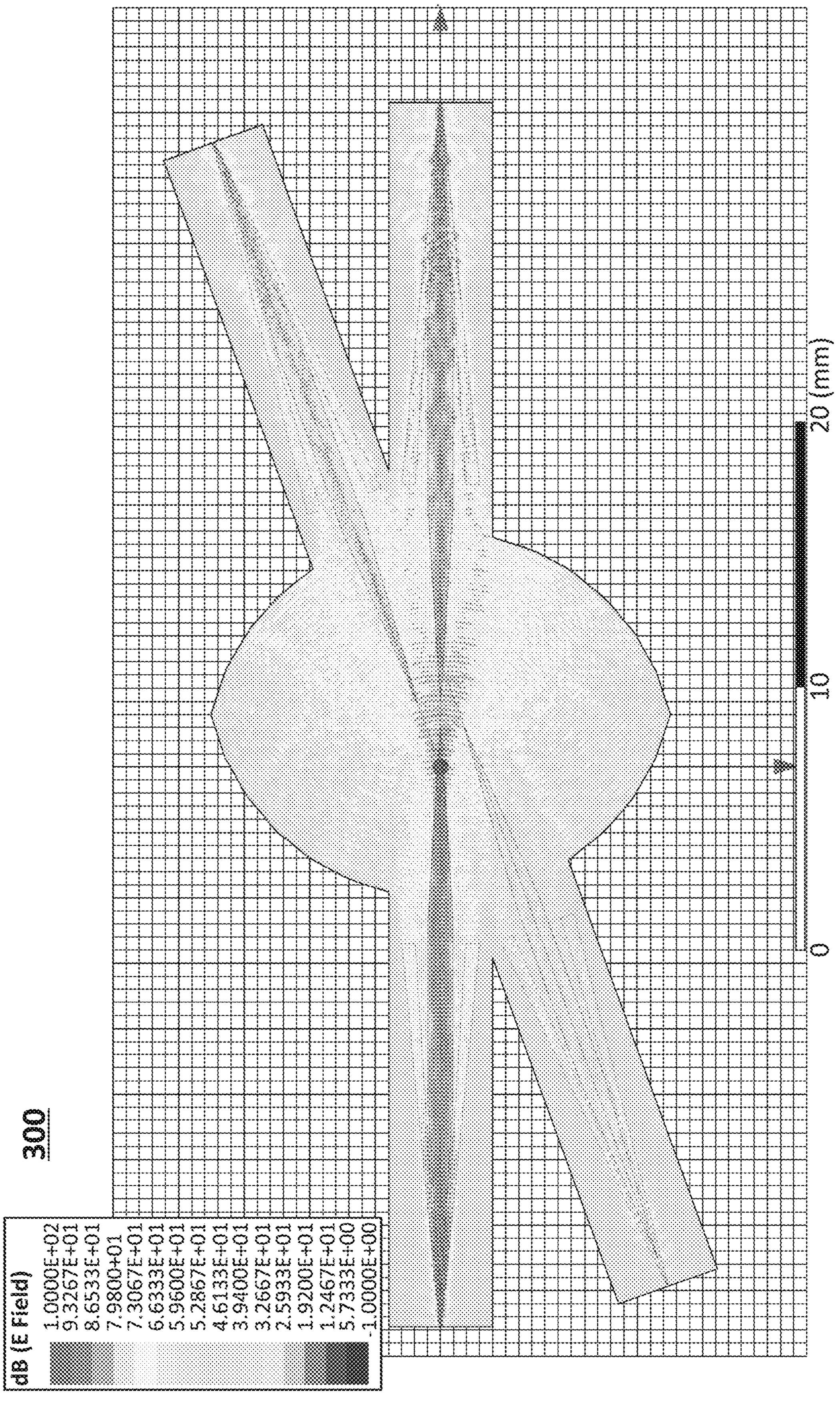

FIG. 4D shows a 3D view of ultra-wideband bidirectional coupler (400C), wherein the free propagation region (410) comprises the same dielectric material as the DW structures and wherein the DW structures have a truncated end.

Figure 1:
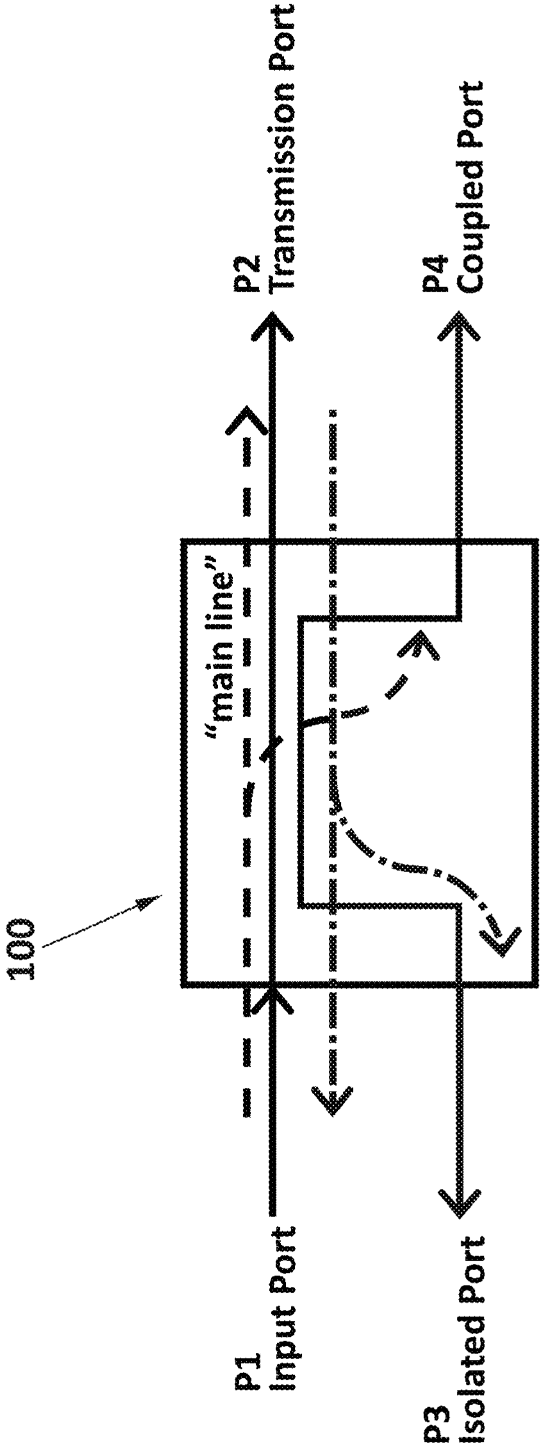
FIG. 1 shows a directional coupler as is commonly understood by experts in the field of radio-frequency engineering.

The operating characteristics of the of ultra-wideband bidirectional coupler (300) of FIGS. 3 and 4A have been characterized through full-wave simulations as shown in FIGS. 5A to 5H, and 6. The E-field amplitude distributions in dB obtained at different frequencies (20 GHz, 60 GHz, 100 GHz, 140 GHz, 180 GHZ, 220 GHZ, 260 GHz, and 300 GHZ) in the range from 20 GHz to 300 GHz are shown in FIGS. 5A to 5H. Specifically, FIGS. 5A to 5H illustrate E-field amplitude distributions in the range between 100 dB [V/m] and to −1 dB [V/m]. As it can be appreciated through FIGS. 5A to 5H, most of the power of an incoming signal at a first port (P-L1) travels through the structure to a second port (P-R2) in a single-mode regime. A small fraction of the incoming power is diverted towards port (P-R4). As shown in FIGS. 5A to 5H, a smaller amount of power of the signal arrives to port (P-L3). For example, at the isolated port P-L3, the E-field amplitudes are 25-30 dB lower than those at the transmitting port P-L1. Due to the single-mode regime, the phase between ports can be univocally defined, which allows its use for instrumentation purposes as shown in FIG. 1.

Figure 6:
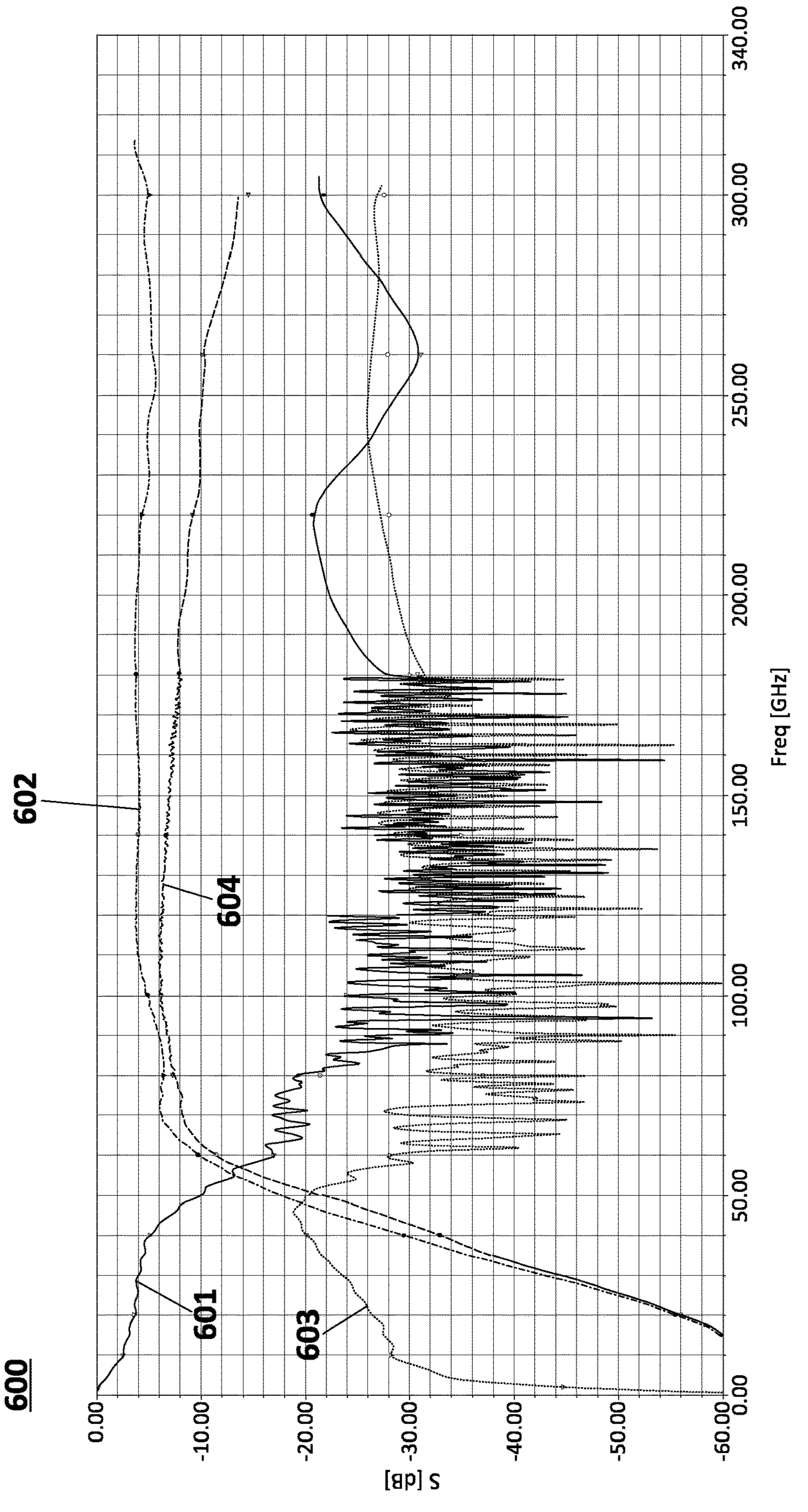
FIG. 6 shows the simulated S parameter amplitude of the particular example of the ultra-wideband bidirectional coupler shown in FIG. 3 according to the present invention.

FIG. 6 shows the simulated S parameter amplitude (in dB) according to a frequency Freq in GHz of a signal through the incident port (P-L1): S11 (601) (incoming port matching), S21 (602) (transmission between port (P-L1) and (P-R2) in FIGS. 3 and 4A), S13 (603) (coupling between the incident port (P-L1) and the isolated port (P-L3) in FIGS. 3 and 4A), and S14 (604) (coupling to the coupled port (P-R4) in FIGS. 3 and 4A).

The transmission between ports (P-L1, P-R2), i.e. S21 (602) stays flat from 65 GHZ to at least 300 GHz. The insertion losses are, approximately 4 dB. The coupling (602) between ports (P-L1, P-R4), i.e. S14 (604) is not constant with frequency, leading to a higher coupler directivity at higher frequencies. Due to the smoothness of the curves, this effect can be easily compensated through a path calibration. The S11 (601) amplitude port matching is lower than-15 dB for the whole band, and lower than −20 dB for frequencies greater than 80 Ghz. The isolation between ports (P-L1, P-L3), i.e. S13 (603) is greater than 25 dB in the whole band.

The ultra-wideband coupler (300) in FIGS. 3 and 4A works as a bidirectional coupler. When port (P-R2) works as the source of incident signal, port (P-L1) works as the transmission port and port (P-L3) works as the coupled port, while port (P-R4) works as the isolated port. The matching, transmission, coupling and isolation parameters can be the same as in FIG. 6, e.g. S22=S11 (601), S12=S21 (602), S32=S41 (604), and S42=S31 (603).

If a transmitter device is connected to port (P-L1) and two receivers to ports (P-L3, P-R4), wherein (P-L4) is optional, port (P-R2) becomes a bi-directional (input and output) port. In a realistic scenario, port (P-R2) would be connected to an antenna, a waveguide or a connector. In a communication application, an antenna may be placed on port (P-R2). In instrumentation applications, port (P-R2) would be connected to the DUT (device under test). The signal received in port (P-L3) would be proportional to the DUT incident signal and the signal received in port (P-R4) would be proportional to the signal incident in the DUT.

Figure 7:
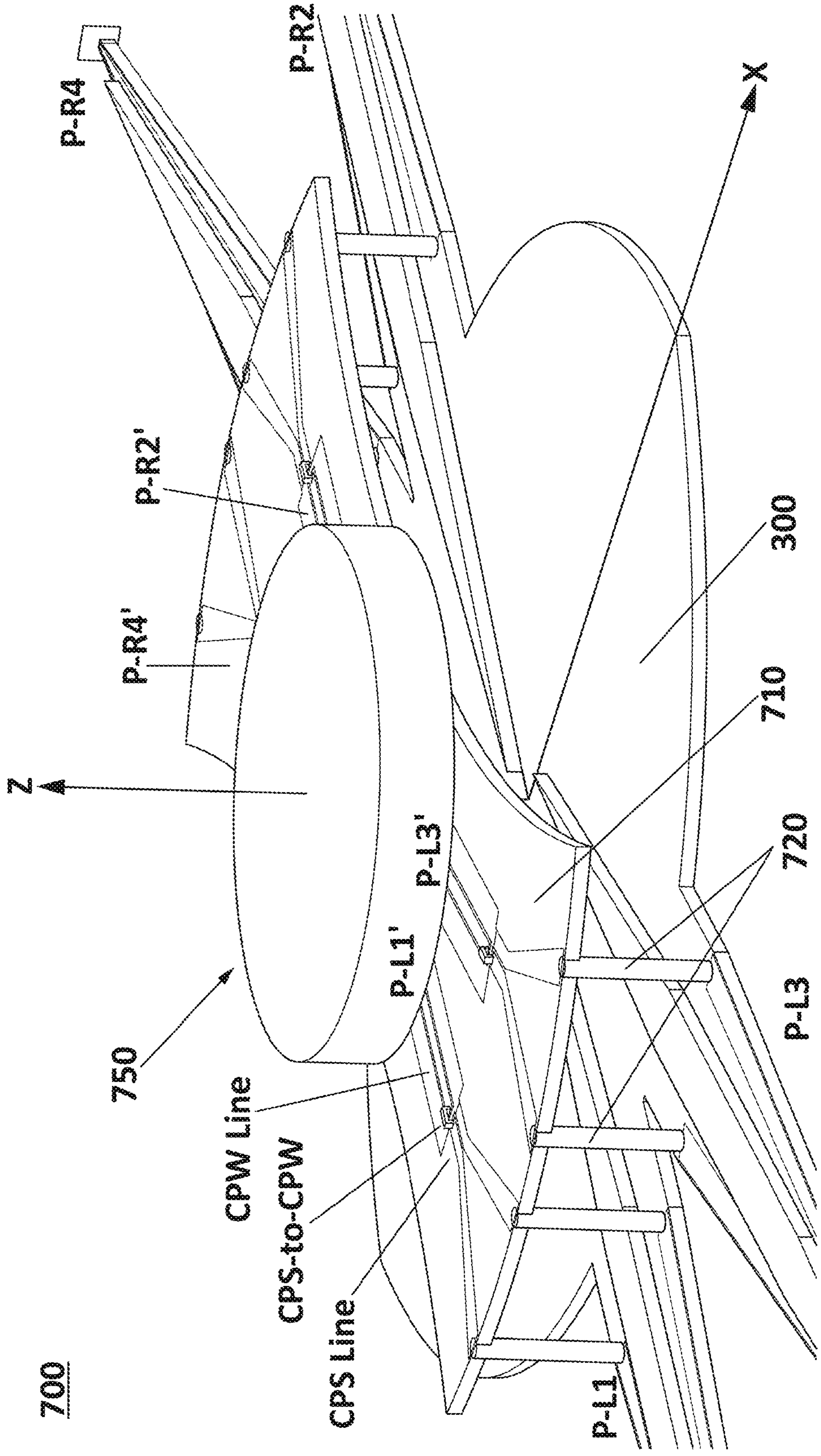
FIG. 7 shows another example of an ultra-wideband bidirectional coupler according to the present invention with extension of the operating frequency range towards lower frequencies.

FIG. 7 shows a coupler (700) that works with a DC extension, which is a solution to extend the operating frequency range of the bidirectional coupler (300) structure in the low frequency range, towards DC. The coupler (700) comprises the bidirectional coupler (300) and further comprises a low-frequency directional coupler (750). The low-frequency directional coupler (750) works for frequencies up to fo=65 GHz. The low-frequency directional coupler (750) comprises ports (P-L1', P-R2', P-L3', P-R4') that are connected to the transmission structures (TSA-L1, TSA-R2, TSA-L3, TSA-R4) ends through metal wires that conforms bifilar lines (720) that can be used for exciting the DW's fundamental mode for all the frequencies above fo and suitable for the integration of the low-frequency directional coupler (750).

For frequencies above fo, the signals are efficiently coupled to the DW structures (DW-L1, DW-R2, DW-L3, DW-R4) from the ports through the structures (TSA-L1, TSA-R2, TSA-L3, and TSA-R4), as illustrated in FIGS. 5A to 5H, and 6. For frequencies below fo, the signal propagates from the ports through a structures TSA though the bifilar lines (720) without being coupled to the DW structures. One of several transitions can be incorporated from the bifilar line (720) to the low-frequency directional coupler ports (P-L1', P-R2', P-L3', and P-R4'). For illustrative purposes, FIG. 7 shows a low-frequency directional coupler (750) with CPW ports (P-L1', P-L3') and the transitions CPS-to-CPW between the bifilar lines (720), the CPS line and the CPW waveguides (CPW Line).

The transitions and the low-frequency directional coupler (750) are placed in a substrate (710) that can be placed far enough over (or under) the dielectric coupler (300). Since the waves propagates in the 2D plane (in the free propagation region (210)), there is no radiation in the normal direction a compact configuration can be achieved. The distance between both couplers (300, 750) must be big-enough for avoiding near-field coupling between the couplers (300, 750).

The invention claimed is:

1. A ultra-wideband radiofrequency bidirectional coupler with power divider/combiner functionality for signals with frequency reaching up to 300 GHz, comprising:

- a free propagation region substrate with a pair of opposed edges;
- a first group of access ports arranged along a first edge of said pair of opposed edges; and
- a second group of access ports arranged along a second edge of said pair of opposed edges,
- wherein the first and second groups of access ports comprise:
- dielectric waveguide structures providing a high-pass filter transfer function operating over a high frequency range starting from a low cut-off frequency $f_{CL}$ in a microwave range or in a millimeter-wave range, and
- wherein the dielectric waveguide structures are coupled by far-field propagation through the free propagation region substrate.

2. The ultra-wideband radiofrequency bidirectional coupler according to claim 1, wherein the first edge of said pair of opposed edges is shaped as an arc of a first circle with radius r1 and a center which is located closer to the second edge.

3. The ultra-wideband radiofrequency bidirectional coupler according to claim 2, wherein the second edge of said pair of opposed edges is shaped as an arc of a second circle with radius r2 and a center which is located closer to the first edge.

4. The ultra-wideband radiofrequency bidirectional coupler according to claim 3, wherein r1=r2.

5. The ultra-wideband radiofrequency bidirectional coupler according to claim 3, wherein the first group of access ports include first and third access ports along the first edge of said free propagation region substrate, the first and third access ports comprising first and third dielectric waveguide structures, respectively,

- wherein the second group of access ports include second and fourth access ports along the second edge of said free propagation region substrate, the second and fourth access ports comprising second and fourth dielectric waveguide structures, respectively,
- wherein a tapered end of the first dielectric waveguide structure points toward a tapered end of the second dielectric waveguide structure,
- wherein a tapered end of the fourth dielectric waveguide structure points towards the center of the second circle, and
- wherein a tapered end of the third dielectric waveguide structure points towards the center of the first circle.

6. The ultra-wideband radiofrequency bidirectional coupler according to claim 5, wherein each of the dielectric waveguide structures of the first and second groups of access ports comprises a dielectric waveguide (DW) tapering profile, and each of the first and second groups of access ports further comprises a respective one of tapered slot antennas providing a low-pass characteristic interconnect, operating over a low frequency range up to a high cut-off frequency $f_{CH}$ in the millimeter wave range, wherein each of the tapered slot antennas comprises a tapered slot antenna (TSA) tapering profile around a first tapered end of a corresponding one of the dielectric waveguide structures, wherein the TSA tapering profile matches the DW tapering profile.

7. The ultra-wideband bidirectional radiofrequency coupler according to claim 3, wherein the radius r1 of the arc of the first circle for the first group of access ports is equal to the radius r2 of the arc of the second circle; and wherein the centers of the first and second circles are radially aligned.

8. The ultra-wideband radiofrequency bidirectional coupler according to claim 1,

- wherein each of the first and second group of access ports further comprises a respective one of tapered slot antennas providing a band-pass filter transfer function, operating over a low frequency range up to a high cut-off frequency $f_{CH}$ in the millimeter wave range, and
- wherein each of the tapered slot antennas comprises a tapered slot antenna (TSA) tapering profile, wherein a first tapered end of each of the dielectric waveguide structures lies between portions of a corresponding one of the tapered slot antennas and comprises a dielectric waveguide (DW) tapering profile, wherein the TSA tapering profile matches the DW tapering profile.

9. The ultra-wideband radiofrequency bidirectional coupler according to claim 8, wherein the TSA tapering profile and the DW tapering profile are linear tapered.

10. The ultra-wideband radiofrequency bidirectional coupler according to claim 8, wherein the TSA tapering profile and the DW tapering profile are exponentially tapered.

11. The ultra-wideband radiofrequency bidirectional coupler according to claim 8, wherein the TSA tapering profile and the DW tapering profile are FERMI or exponentially tapered.

12. The ultra-wideband radiofrequency bidirectional coupler according to claim 1, further comprises:

a low-frequency directional coupler with operating frequency range starting at DC or from a low-frequency in the kilohertz range and reaching up to a low cut-off frequency $f_{DCH}$ in the millimeter wave range, wherein $f_{DCH}$>a low cut-off frequency $f_{CL}$ of the dielectric waveguide structures;

a plurality of transmission lines and waveguide transitions that connect low-frequency directional coupler and the tapered slot antennas for a combined operating frequency range up to a high cut-off frequency $f_{CH}$.

13. The ultra-wideband radiofrequency bidirectional coupler according to claim 1, wherein the dielectric waveguide structures of the the first and second groups of access ports are established on top of the free propagation region substrate.

14. The ultra-wideband radiofrequency bidirectional coupler according to claim 1, wherein the dielectric waveguide structures of the first and second groups of access ports are embedded in the free propagation region substrate.

15. The ultra-wideband radiofrequency bidirectional coupler according to claim 1, wherein each of the dielectric waveguide structures of the first and second groups of access ports has a truncated end.

16. The ultra-wideband radiofrequency bidirectional coupler according to claim 1, wherein the free propagation region substrate has a different permittivity than the dielectric waveguide structures of the first and second groups of access ports.

17. The ultra-wideband radiofrequency bidirectional coupler according to claim 1, wherein the free propagation region substrate comprises absorbers.

18. The ultra-wideband radiofrequency bidirectional coupler according to claim 1, wherein the free propagation region substrate comprises dielectric material.

* * * * *